United States Patent [19]
Bernier

[11] 4,374,001
[45] Feb. 15, 1983

[54] ELECTROLYTIC PRINTING

[75] Inventor: William E. Bernier, Endicott, N.Y.

[73] Assignee: International Business Machines Corporation, Armonk, N.Y.

[21] Appl. No.: 231,832

[22] Filed: Feb. 5, 1981

[51] Int. Cl.$^3$ ...................... G01D 15/06; G01D 15/34
[52] U.S. Cl. ........................................................ 204/2
[58] Field of Search ..................................... 204/2, 15

[56] References Cited

U.S. PATENT DOCUMENTS

| | | | |
|---|---|---|---|
| 3,518,038 | 6/1970 | Spatz | 204/15 |
| 3,951,757 | 4/1976 | Yoshino | 204/2 |
| 4,211,616 | 7/1980 | Sambucetti | 204/2 |
| 4,309,255 | 1/1982 | Gendler | 204/2 |

*Primary Examiner*—T. Tufariello
*Attorney, Agent, or Firm*—Pollock, Vande Sande & Priddy

[57] ABSTRACT

An electrochromic printable media which includes a substrate coated with certain leuco dyes and with a bromide compound; and use thereof for electrochromic printing.

24 Claims, No Drawings

ELECTROLYTIC PRINTING

TECHNICAL FIELD

The present invention is concerned with an improved electrochromic printable media and to a method for electrolytic printing employing the media. The method of the present invention includes the use of nonconsumable electrodes.

BACKGROUND ART

In the electrolytic printing art there are at least two general schemes for printing processes. In one such scheme, metallic ions from one of the electrodes are introduced into the printing sheet, and they are either combined with colorless materials already present in the printing sheet in order to form colored complexes or are precipitated as fine metallic particles.

A disadvantage of the above discussed consumable scheme is the fact that the stylus is consumed in the process. This requires complicated printed mechanisms with feeding devices to keep the stylus working.

In another scheme, the electrodes are not consumed, and the writing is accomplished by the electrolytic modification of materials already in the printing sheet. An example of such a procedure is one which employs the reaction of starch and iodine to effect writing. Generally, in this scheme, the electrolysis of potassium iodide or another iodide compound in the paper generates free iodine which reacts with the starch which is also present in the paper, thereby producing a purple starch-iodide complex.

Another example of such a scheme includes a dry electrolytic printing in which a very special paper is used consisting of one or two metallized layers. Inherent in this scheme are the disadvantages of requiring expensive paper, requiring special layers of materials, and the requirement of voltages that exceed 100 volts for printing.

The nonconsumable schemes, such as the starch-iodine method, suffer from the lack of permanency of the printing due to fading of the printed works and also the discoloration of the paper upon storage.

SUMMARY OF INVENTION

The present invention provides an improved electrochromic printable media which upon printing exhibits improved resistance to fading of the printed indicia. Although some discoloration of the background, such as the paper itself, occurs upon storage due to subsequent development of the material on the substrate not subjected to the voltage pattern, the desired colored indicia is still discernable in view of its resistance to fading.

An object of the present invention is to provide an electrochromic printable media which is suitable in a printing process whereby the power requirements for the printing are such that the desired printing can be operated by use of integrated circuits. In other words, the voltages, currents, and times required for printing are such that they are compatible with those values deliverable by integrated circuits.

Another object of the present invention is to provide an improved electrochromic printing media for use in a non-consumable stylus electrolytic printing process. In addition, an object of the present invention is to provide an electrochromic printing media in which plain paper can be employed.

The electrochromic printable media of the present invention comprises a substrate coated on at least one surface thereof with a leuco dye of the formula:

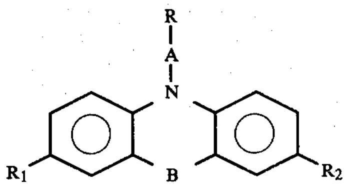

wherein A is C═O or $SO_2$ and B is S or O. Each $R_1$ and $R_2$ of the above formula individually is a group capable of donating an electron and is preferably selected from the group of $OR_3$, $NR_4R_5$ and $R_6$. Each $R_3$, $R_4$, and $R_5$ is individually hydrogen or an alkyl group generally containing 1 to 8 carbon atoms. Each $R_6$ is an alkyl group usually containing 1 to 8 carbon atoms. R of the above formula is an organic radical such that in the presence of bromine and upon being subjected to a voltage, the leuco dye converts to a colored dye upon splitting off of the A—R group.

Also coated on the substrate is a bromide compound. The bromide compound is present in an amount sufficient to catalyze an electro-oxidation of the leuco dye.

The present invention is also concerned with the method of electrochromic printing which comprises applying an electric field in a predetermined pattern across the electrochromic printable media described hereinabove.

BEST AND VARIOUS MODES FOR CARRYING OUT INVENTION

The present invention requires coating at least one surface of at least one leuco dye having the following formula:

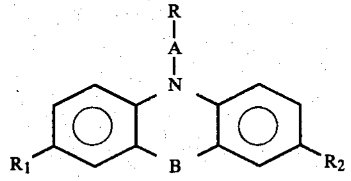

A in the above formula is either C═O or $SO_2$, and preferably is C═O. B in the above formula is S or O and is preferably S. Each $R_1$ and $R_2$ individually is a group which is capable of donating an electron. Preferably, each $R_1$ and $R_2$ group individually is either $OR_3$ or $NR_4R_5$ or $R_6$, wherein each $R_3$, $R_4$, and $R_5$ is individually hydrogen or an alkyl group preferably containing 1 to 8 carbon atoms, and $R_6$ is an alkyl group preferably containing 1 to 8 carbon atoms. The preferred $R_1$ and $R_2$ groups are OH, $N(CH_3)_2$, $N(C_2H_5)_2$, and $NCH_3H$, and most preferably are OH and $N(CH_3)_2$.

In the above formula R is an organic radical such that in the presence of bromine and upon being subjected to voltage, the leuco dye converts to a colored dye upon splitting off of the A—R group from the molecule. Preferred R groups include alkyl, aryl, substituted aryl, cycloaliphatic, and heterocyclic groups. Preferably, the R groups containing 1 to 22 carbon atoms, and most preferably 1 to 12 carbon atoms.

Examples of some alkyl groups are methyl, ethyl, butyl, amyl, hexyl, 2-hexyl, 2-ethylhexyl, nonyl, and octadecyl.

Examples of some aryl groups include phenyl, phenanthryl, and anthracyl.

Examples of some cycloalkyl radicals include cyclopropyl, cyclopentyl, cyclobutyl, cyclohexyl, cycloheptyl, cyclooctyl, and cyclododecyl.

Examples of some substituted aryl groups include aralkyl groups such as phenylmethyl and naphthylethyl; alkaryl groups such as tolyl, xylyl, and cumyl; alkoxy substituted aryl groups such as methoxyphenyl; sulfonic acid and salt derivatives such as parasulfonic phenyl and the alkali metal salts of parasulfonic phenyl; and carboxy substituted aryl groups such as paracarboxyphenyl. The sulfonic and carboxy groups render the compounds water soluble. Examples of some heterocyclic groups are those which contain from 5 to 6 members in the ring and contain S, O and/or N in the ring and include morpholinyl, piperidyl, thiophenyl, furanyl, pyrrolyl, and quinolinyl.

Examples of some suitable leuco dyes employed according to the present invention include benzoyl leuco methylene blue, which has the following formula:

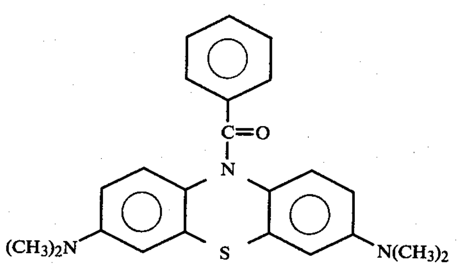

p-sulfonic-benzoyl leuco methylene blue, p-carboxy benzoyl leuco methylene blue, thiazine and oxazine. Mixtures can be employed if desired.

The leuco dye can be applied to the substrate in the form of a solution in water or organic solvent depending upon the solubility characteristics of the particular dye employed. For instance, the use of benzoyl leuco methylene blue requires an organic solvent such as an alcohol, such as methyl alcohol, ethyl alcohol; ketones such as acetone; and ether.

The leuco dye is generally employed in amounts of about 2 to about 100 milligrams per standard page (e.g. 8½" by 11" substrate area). Of course, the relative amount of dye will be adjusted upwardly or downwardly depending upon the size of substrate specifically employed. Amounts greater than about 10 milligrams for the above size substrate are generally not necessary, since about 10 milligrams are sufficient to saturate the substrate surface.

In addition, the substrate surface is coated with a bromide compound. Examples of suitable bromides include ammonium bromide, potassium bromide, and sodium bromide. Mixtures can be employed if desired. The bromide is present in amounts from about 10 milligrams to about 1 gram per standard page (e.g. 8½ by 11" size substrate). Generally, the bromide is present in an amount so as to provide a bromide to leuco dye weight ratio of about 1 to about 1 to about 30 to about 1. The preferred weight ratio is about 5.1 to about 1:1. It is believed that the following reaction is accomplished when a current pulse is passed to a substrate having the printing composition thereon:

$$2Br^- \rightarrow Br_2 + 2e^- \text{ (at anode)}$$

$$Br_2 + \text{Leuco Dye} \rightarrow 2Br^- + \text{Colored Dye.}$$

The bromide is present so as to provide an electro oxidation of the colorless leuco dye into a colored dye. The bromine is generated at the anode.

A preferred bromide composition contains about 9% by weight of ammonium bromide and a buffer such as about 1.4% by weight of $KH_2PO_4$.

The leuco dye in the present invention is the color-forming agent and other color-forming agents such as iodides are not required, and preferably are not present. In particular, it is preferred that the media is at least substantially free from color-forming agents which might tend to react chemically with the dyes.

The substrate employed can be ordinary paper.

At least the surface of the substrate is generally coated by first applying the bromide compound in the form of an aqueous solution followed by application of the leuco dye. If desired, the dye can be applied and then the bromide compound. It has been found that with certain of the leuco dyes employed according to the present invention, it is difficult to apply both the bromide and dye together in the same composition in view of differences in solubility characteristics. Also if desired, the substrate can be coated on both surfaces or even totally impregnated with the compositions.

The prepared printing composition can be applied to the substrate, such as ordinary paper, by spray or other coating technique. It can be applied just prior to printing or can be applied to the substrate to be used at some future time.

Printing can be provided by conventional electrolytic printers. Particularly, nonconsumable electrodes can be used. A voltage of about 0.5 to about 15 volts is all that is required when employing the printing media of the present invention to effect the color change. Generally, about 5 volts or more are employed to operate the electronics of the circuitry used. In addition, the voltage, current and time required are all compatible with those parameters achieved by modern day integrated circuits. The time employed is generally from about 100 to about 1000 microseconds. In addition, for a 10 mil electrode up to only about 4 milliamps of current is needed. The amount of current will change depending upon the size of the electrode.

If the bromide compounds are not present, the printing achieved by the present invention would not be obtainable. For instance, only very little printing can be achieved even employing very long pulses of about 10 to about 20 milliseconds when bromide is not employed on the substrate using the leuco dyes of the present invention.

It is noted that the conditions employed for printing according to the present invention are quite different than those required from, for instance, dry electrolytic printing. The large voltages required for such electrolytic printing do not render such media suitable for use with integrated circuits. The power requirements are not compatible with those generated by integrated circuits.

The substrate or paper is generally wetted by water immediately prior to printing.

The following nonlimiting example is presented to further illustrate the present invention.

EXAMPLE

Ordinary paper (about 8½"×11") is coated with a composition containing an aqueous composition of about 9% by weight of potassium bromide and about 1.4% by weight of potassium dihydrogen phosphate. The composition is filtered and sprayed onto ordinary paper. After drying, the paper is then coated with a solution of about 0.2% by weight of benzoyl leuco methylene blue in acetone to provide about 10 milligrams of leuco dye per page. The paper is then subjected to electrolytic printing apparatus. Indicia is then electrolytically printed on the paper by applying in a predetermined voltage pattern of about 10 volts thereacross. The pulse time is about 140 microseconds. The electrode employed is about 4 mils wide and about 4 milliamps of current are employed. The printed indicia is blue-black.

The present invention can employ very high speeds of printing such as about 100 microseconds per dot for the dyes wherein B in the above formula is S and about 1 millisecond for the dyes when B in the above formula is O. The indicia printed under normal conditions of storage is substantially permanent and does not fade. Even with some formation of background due to subsequent development of the undeveloped portions, the printing indicia is still quite discernable.

What is claimed is:

1. An electrochromic printing media which comprises a substrate coated on at least one surface thereof with about 2 to about 100 milligrams for each 8½" by 11" area of said substrate of a leuco dye color forming material of the formula:

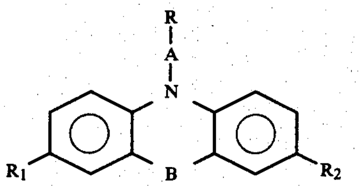

wherein A is C=O or $SO_2$; B is S or O; each $R_1$ and $R_2$ individually is a group capable of donating an electron; and R is an organic radical such that in the presence of bromine and upon being subjected to a voltage, the leuco dye converts to a colored dye upon splitting of the A—R group; and coated with at least about 10 milligrams for each 8½" by 11" area of said substrate of said leuco dye; and wherein the weight ratio of bromide to leuco dye is about 1 to 1 to about 30 to 1.

2. The electrochromic printing media of claim 1 wherein each $R_1$ and $R_2$ individually is selected from the group of $OR_3$, $NR_4R_5$, and $R_6$ wherein each $R_3$, $R_4$ and $R_5$ is individually hydrogen or an alkyl group and each $R_6$ is an alkyl group.

3. The electrochromic printable media of claim 2 wherein said alkyl group contains 1 to 8 carbon atoms.

4. The electrochromic printing media of claim 1 wherein each $R_1$ and $R_2$ individually is selected from the group of OH, $N(CH_3)_2$, $N(C_2H_5)_2$, $NCH_3H$, and $CH_3$.

5. The electrochromic printing media of claim 1 wherein each $R_1$ and $R_2$ individually is selected from the group of OH and $N(CH_3)_2$.

6. The electrochromic printing media of claim 1 wherein R is selected from the group of alkyl, aryl, substituted aryl, cycloaliphatic, and heterocyclic.

7. The electrochromic printing media of claim 6 wherein R contains 1 to 22 carbon atoms.

8. The electrochromic printing media of claim 6 wherein R contains 1 to 12 carbon atoms.

9. The electrochromic printing media of claim 1 wherein R is phenyl.

10. The electrochromic printing media of claim 1 wherein R is $CH_3$.

11. The electrochromic printing media of claim 1 wherein A is CO.

12. The electrochromic printing media of claim 1 wherein B is S.

13. The electrochromic printing media of claim 1 wherein said leuco dye is benzoyl leuco methylene blue.

14. The electrochromic printing media of claim 1 wherein the weight ratio of bromide to leuco dye is about 5:1 to about 10:1.

15. The electrochromic printing media of claim 1 wherein the maximum amount of said leuco dye is about 10 milligrams.

16. The electrochromic printing media of claim 1 wherein the bromide is employed in an amount of about 10 milligrams to about 1 gram for each 8½" by 11" area of substrate.

17. The electrochromic printing media of claim 1 wherein the bromide is selected from the group of ammonia bromide, potassium bromide, sodium bromide, and mixtures thereof.

18. The electrochromic printing media of claim 1 wherein said substrate is ordinary paper.

19. A method of electrochromic printing which comprises applying an electrical field in a predetermined pattern across the electrochromic printable media of claim 1.

20. The method of claim 19 wherein the voltage applied is about 0.5 to about 15 volts.

21. The method of claim 19 wherein the voltage applied is at least about 5 volts.

22. Method for preparing the electrochromic printing media of claim 1 which comprises first coating said substrate with an aqueous solution of a bromide followed by coating the substrate with an organic solvent solution of said leuco dye.

23. The media of claim 1 which is at least substantially free from iodides.

24. The media of claim 1 which is at least substantially free from color-forming agents other than said leuco dye color forming material.

* * * * *